United States Patent [19]

Boumera et al.

[11] Patent Number: 5,910,360
[45] Date of Patent: Jun. 8, 1999

[54] GLASS ARTICLE CARRYING A TRANSPARENT PROTECTIVE LAYER WHICH IS RESISTANT TO ABRASION AND CAN BE LABELED AND PROCESS FOR OBTAINING IT

[75] Inventors: Jean-Marc Boumera, Serres-Sainte-Marie; Maurice Bourrel; Jean-Michel Chabagno, both of Pau, all of France; Hendrikus Johannes Cornelis Gijsen, Oost-Souburg, Pays-Bas; Leendert Cornelis Hoekman, Goes, Pays-Bas, both of Netherlands

[73] Assignee: Elf Atochem Vlissingen B.V., Netherlands

[21] Appl. No.: 08/988,069

[22] Filed: Dec. 10, 1997

[30] Foreign Application Priority Data

Jun. 11, 1996 [FR] France ................................. 96 07234
Mar. 7, 1997 [FR] France ................................. 97 02728
Jun. 4, 1997 [WO] WIPO .................... PCT/FR97/00988

[51] Int. Cl.$^6$ ................................................. B32B 17/06
[52] U.S. Cl. ................ 428/341; 427/387; 427/389.7; 428/34.4; 428/34.6; 428/34.7; 428/429; 428/441
[58] Field of Search ...................... 156/306.3; 427/372.2, 427/387, 389.7; 428/34.4, 34.6, 34.7, 340, 341, 428, 429, 441, 903.3

[56] References Cited

U.S. PATENT DOCUMENTS

| | | | |
|---|---|---|---|
| 3,368,915 | 2/1968 | Carl | 428/336 |
| 3,438,801 | 4/1969 | Schilentz et al. | 428/336 |
| 3,663,254 | 5/1972 | Wade | 106/271 |
| 3,718,449 | 2/1973 | Fahey | 65/448 |
| 3,801,361 | 4/1974 | Kitaj | 428/429 |
| 3,873,352 | 3/1975 | Kitaj | 428/210 |
| 4,130,673 | 12/1978 | Larkin | 427/255 |
| 4,130,677 | 12/1978 | Huntsberger | 427/379 |

FOREIGN PATENT DOCUMENTS 0240919  10/1987  European Pat. Off. .
977820  12/1994  United Kingdom .

OTHER PUBLICATIONS

International Application WO 95/00259, International Publication date of Jan. 5, 1995.
International Application WO 96/26163, filed Feb. 22, 1995. (Aug. 29, 1996).
Search Report dated Sep. 24, 1997.
Search Report dated Mar. 7, 1997.
Search Report dated Sep. 22, 1997.

*Primary Examiner*—D. S. Nakarani
*Attorney, Agent, or Firm*—Millen, White, Zelano, & Branigan, P.C.

[57] ABSTRACT

A glass article, especially of hollow glass, carries a coating resulting from the deposition, in one or two stages, onto the surface of the glass, of at least one monoaminosilane and of at least one lubricating substance such as an optionally oxidized or partially oxidized polyolefin. The coating provides desirable properties of wet and dry abrasion resistance (scratch resistance), substantial invisibility, and adhesiveness for labels. Articles having labels directly attached to said coating are also provided as well as the process for obtaining the desired properties.

37 Claims, No Drawings

GLASS ARTICLE CARRYING A TRANSPARENT PROTECTIVE LAYER WHICH IS RESISTANT TO ABRASION AND CAN BE LABELED AND PROCESS FOR OBTAINING IT

CROSS-REFERENCE TO RELATED APPLICATIONS

This application is a continuation-in-part of Applicants' International Application PCT/FR97/00988 filed Jun. 4, 1997, designating the United States and other countries, claiming priority of French Application FR 96.07234 filed Jun. 11, 1996, and French Application FR 97.02728 filed Mar. 7, 1997, all of said applications being incorporated by reference herein.

FIELD OF THE INVENTION

The invention relates to glass articles, in particular of hollow glass, carrying a coating which, while giving them good resistance to abrasion, has a good appearance (homogeneous, transparent and invisible coating) and enables labels to adhere.

BACKGROUND OF THE INVENTION

Glass articles, in particular hollow glass, when being handled, filled, packaged and possibly washed before being reused, can bump into each other, producing abrasion, in particular scratches, which reduces their mechanical strength.

The surface of glass articles has already been treated in order to improve their abrasion resistance, regardless of whether these glass articles are dry or wet, for example as a result of being washed.

Thus, document U.S. Pat. No. 3,438,801 describes the treatment of glass bottles to improve their dry abrasion resistance by deposition, in a first stage, at 150° C., of an aqueous solution of a diaminosilane (3-(2-aminoethyl) aminopropyltrimethoxysilane, (here called DAMO) and, in a second stage at 140° C., of an aqueous emulsion of polyethylene used in combination with potassium oleate.

These glass bottles are generally intended to be labeled and, consequently, the abrasion-resistant layer applied to the surface of the glass must also allow good adhesiveness of a label by means of conventional adhesives like casein and dextrin. To obtain this good adhesiveness, as well as an appropriate abrasion resistance, U.S. Pat. No. 3,873,352 describes treating the surface of the glass with an aqueous composition containing polyethylenaminepropyltrimethoxysilane which has a molecular mass of approximately 1400 (or a mixture of this silane with a diaminosilane, DAMO) and polyethylene used in combination with potassium oleate.

It has been noted, however, that these layers have a cloudy appearance which makes the glass article unusable, and that the resistance to abrasion in the wet state is not sufficient. In addition, some of these layers do not enable labels to adhere well.

Attempts have therefore been made to form, on glass surfaces, coatings which have a good appearance and to which labels adhere well, while providing resistance to abrasion when dry and in the wet state.

There has also been research for a simple process for producing them, which can be exploited industrially, both on the production line for these glass articles and when they are recycled, for example, in order to be refilled.

SUMMARY OF THE INVENTION

One object of this invention is to provide glass articles having the above-desired properties by virtue of a particular coating applied thereto.

Another object of the invention is to provide such glass articles having labels directly adhered to the coating.

Still another object of the invention is to provide one or more processes for producing the glass articles of the invention.

Upon further study of the specification and appended claims, other objects and advantages of the invention will become apparent.

The glass articles according to the invention which have these desired properties carry a coating resulting from the application, onto the glass surface, of at least one monoaminosilane and of at least one lubricating substance, the monoaminosilane(s) corresponding to the general formula:

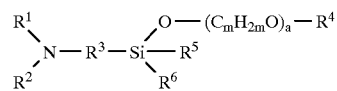

I or its quaternized form:

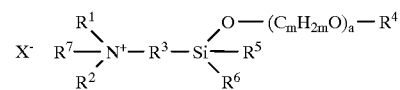

II in which:

each of $R^1$ and $R^2$, which are identical or different, denotes a hydrogen atom or an alkyl group containing from 1 to 4 carbon atoms, $R^3$ is a linear or branched alkylene group containing 2 to 11 carbon atoms, in particular 3 to 5 carbon atoms, or an oxyalkylene or polyoxyalkylene group containing from 2 to 4 carbon atoms in the alkylene chain, this oxyalkylene or polyoxyalkylene group being bonded to the silicon via a carbon atom, $R^4$ denotes an alkyl group containing 1 to 4 carbon atoms, each of $R^5$ and $R^6$, which are identical or different, denotes an alkyl group containing 1 to 4 carbon atoms or else a group —O—$(C_nH_{2n}O)b$—$R^4$ in which $R^4$ has the above meaning, each of m and n, which are identical or different, denotes the integer 2, 3 or 4, each of a and b, which are identical or denotes the integer 0, 1 or 2, $R^7$ denotes a hydrogen atom or an alkyl group containing from 1 to 4 carbon atoms, and $X^-$ is an anion such as chloride, bromide, sulphate or methylsulphate.

In particular, in the coating, the dry quantity of monoaminosilane(s) deposited on the utilized surface of glass is generally (a1) between $10^{-4}$ mg/cm$^2$ and $5 \times 10^{-2}$ mg/cm$^2$, (a2) advantageously between $6 \times 10^{-3}$ mg/cm$^2$ and $5 \times 10^{-2}$ mg/cm$^2$, and (a3) preferably between $1.4 \times 10^{-3}$ to $5.6 \times 10^{-3}$ mg/cm$^2$ and the dry quantity of lubricating substance(s) deposited on the utilized surface of glass is generally (a1) between $5 \times 10^{-4}$ mg/cm$^2$ and $5 \times 10^{-2}$ mg/cm$^2$, (a2) advantageously between $2 \times 10^{-3}$ and $1 \times 10^{-2}$ mg/cm$^2$ and, (a3) preferably, between $2 \times 10^{-3}$ mg/cm$^2$ and $4.5 \times 10^{-3}$ mg/cm$^2$, all values being inclusive.

Utilized surface is intended to mean the surface of the glass article which is usually subjected to abrasion and which must, consequently, receive a protective coating.

In the above formulae of the monoaminosilanes, $R^1$ and $R^2$, which are identical or different, preferably denote a hydrogen atom or a methyl group, $R^3$ is, for example, a propylene, butylene, isopropylene and, preferably, propylene group, an oxyethylene, oxypropylene, oxybutylene or polyoxyethylene, polyoxypropylene or polyoxybutylene group or a polyoxyalkylene group containing a number of different oxyalkylene units, $R^4$ preferably denotes a methyl or ethyl group, each of $R^5$ and $R^6$, which are identical or different, preferably denotes a methyl or ethyl group or else the group —O—$(C_nH_{2n}O)_b$—$R^4$, m and n preferably denote the integer 2 or 3, a and b preferably denote the number 0, 1 or 2, $R^7$ is preferably a hydrogen atom or a methyl group and $X^e$ is the chloride, bromide, sulphate or methylsulphate anion.

Monoaminosilanes which are particularly useful in the invention are, for example, 3-aminopropyltrimethoxysilane, 3-aminopropyltriethoxysilane, 4-aminobutyltrimethoxysilane, N-methyl-3-aminopropyltrimethoxysilane and 3-aminopropyltris(2-methoxyethoxy-ethoxy)silane.

The lubricating substance, useful in the invention, may be advantageously oleic acid, sodium stearate, ammonium stearate, an alkylamine acetate with a long chain (number of carbon atoms greater than or equal to 8) like tallow or coconut, polyethylene glycol, a polyolefin or a mixture of these products. In particular it is an optionally oxidized or partially oxidized polyolefin.

The oxidized or partially oxidized polyolefin may be advantageously polyethylene, polypropylene or polyisobutylene. It is preferably polyethylene.

Oxidized or partially oxidized polyethylene which has a relatively low weight-average molecular mass, for example between 1000 and 15,000 is advantageously employed.

A process for manufacturing this glass article comprises depositing onto the glass surface the silane(s) and the lubricating substance(s) and heat-treating them simultaneously or successively.

The heat treatment preferably takes place at a temperature of between 60° C. and 160° C. and more particularly between 80° C. and 150° C. In our experience, according to our method, at temperatures higher than 160° C., the layers obtained generally do not allow the labels to adhere well and the optical quality of the deposit is unacceptable.

In particular, to obtain the coating which has the properties sought after, it is sufficient that at least the glass surface is heated to a temperature in the range shown, that is to say to a temperature of preferably between 60° C. and 160° C. and advantageously between 80° C. and 150° C., before or after the deposition of the components silane(s) and lubricating substances). The surface temperature can be controlled by any appropriate means, for example by employing an infrared pyrometer.

It is also important that the heat treatment is not conducted for an excessive time; otherwise, the labelability and the appearance of the coating will be destroyed. Thus, the temperature/time conditions must be adjusted to take this into account. For example, the desired properties can be obtained by heating the glass surface from ambient temperature (about 25° C.) to 80° C. in only 10 seconds, with no further heating being necessary. Conversely, when the heat treatment is conducted at 150° C. for 10 minutes or even for 4 minutes, the labelability and appearance of the resultant coating is quite unsatisfactory. This means that the extensive chemical reaction produced by a heat treatment at longer times leads to undesirable coatings. In any case, once a skilled worker is advised of the importance of limiting the time of the heat treatment, it will be possible to develop an optimum temperature/time procedure for any given system according to the present invention.

The process of deposition onto the glass surface, described above, can be carried out in a single stage, the silane(s) and the lubricating substance(s) being in the same composition. It is also possible to deposit the silane(s) in a first stage and then the lubricating substance(s) in a second stage.

The coating formed on the surface of the glass is obtained, for example, from aqueous compositions of monoaminosilane(s) and of lubricating substance(s).

In particular, whether the deposition is carried out in a single stage or in two stages, the aqueous compositions employed for these depositions may contain from 0.005% to 2% by weight, preferably from 0.01 to 1.5% by weight of monoaminosilane(s) and from 0.10 to 2% by weight, preferably from 0.15% to 1.5% by weight of lubricating substance(s).

As indicated above, the lubricating substance is advantageously an optionally oxidized or partially oxidized polyolefin. It is generally in the form of a nonionic or ionic aqueous emulsion.

The deposition may be carried out on the glass surface by any appropriate process, for example by brushing or spraying, particularly when the surface to be treated is at high temperature, or by spraying or dipping in an aqueous solution when the surface to be treated is at a low temperature.

The composition(s) may be sprayed onto the glass surface by any appropriate means and, in particular, by employing a pneumatic spraying device or an ultrasonics-assisted spraying device.

When the deposition is done by brushing, a brush may be employed which is impregnated with the composition or else with a precipitate obtained by precipitation of the components in an acidic medium.

According to one embodiment of the invention, an aqueous composition of monoaminosilane(s) and of lubricating substance(s) is deposited in a single stage. This composition may be deposited directly onto the glass surface at a temperature which is in the range indicated above, that is to say at a temperature of preferably between 60° C. and 160° C. and, advantageously, between 80° C. and 150° C. The heat treatment is then simultaneous.

It is also possible to deposit the composition of monoaminosilane(s) and of lubricating substance(s) onto the glass surface which is at a temperature lower than 60° C., for example at the ambient temperature or at a lower temperature. This is particularly the case when the glass articles, like bottles, are to be recycled. After the deposition onto the glass surface, the components are heat-treated by heating at least the glass surface to a sufficient temperature for example, within the range indicated above, and for a sufficient time to obtain the desired properties.

Another embodiment of the invention comprises depositing onto the glass surface, in a first stage, an aqueous solution of monoaminosilane(s) and, in a second stage, an aqueous composition of lubricating substance(s). The aqueous solution of silane(s) may be deposited directly onto the glass surface at a temperature of preferably between 60° C. and 160° C. and the aqueous composition of lubricating substance(s) is next deposited still at a temperature of preferably between 60° C. and 160° C. Between the two depositions it may be necessary to heat the glass article to be treated in order that at least the glass surface should be at the temperature necessary for the deposition of the aqueous composition of lubricating substance(s), that is to say at a temperature within the above range.

Another process comprises depositing, first, the aqueous solution of silane(s) onto the surface of the glass which is at a temperature lower than 60° C., for example at the ambient temperature, and then in heating at least the glass surface to a temperature of generally between 60° C. and 160° C., preferably between 80° C. and 150° C., and, next, in depositing the aqueous composition of lubricating substance (s). To produce this second deposit according to the invention, at least the glass surface should be heated, if necessary, to a temperature of preferably between 60° C. and 160° C. before or after the deposition of this aqueous composition of lubricating substance(s).

According to another embodiment of the invention, the aqueous solution of silane(s) and the aqueous composition of lubricating substance(s) are deposited successively at a temperature lower than 60° C. and then the deposit is heat-treated by heating at least the glass surface to a temperature of preferably between 60° C. and 160° C.

The heat treatment may be performed by any appropriate means. In particular, it may take place at the exit from the annealing lehr, during the manufacture of the glass articles. It may also be carried out in an oven, with a hot air blast, with infrared radiation or microwaves.

When the deposition of the components silane(s) and lubricating substance(s) takes place on the surface of the glass at a temperature higher than 60° C. or, preferably, higher than 80° C., an increase in temperature for the heat treatment is not necessary; in this case the deposition and the heat treatment are done simultaneously.

The deposition of the components on the surface of the glass articles at low temperature may offer an advantage, in particular in the case of recycling with a view to the articles being reused. This deposition may take place, for example, after the washing of these articles.

At this juncture, attention is directed to U.S. Pat. No. 4,130,677 of Huntsberger of E.I. DuPont de Nemours, Inc. The invention therein is directed to a process for applying to glass a film capable of delaminating from glass and containing cullet breakage. The film comprises an intermediate coating upon which a second coating is applied. This second coating is a copolymer of an alpha olefin having 3–10 carbon atoms and of an alpha, beta-unsaturated carboxylic acid having 3–8 carbon atoms, the mol proportion of the carboxylic acid being about 0.2–5% of the total monomers. In the present invention, however, it is unnecessary to utilize such a second coating, which is an essential part of the film of the patent. Of additional interest is the nature of the intermediate coating which is used for providing adherence of the second coating to the glass. This intermediate coating is a layer of a two component system wherein one component is γ-aminopropyltriethoxysilane that bonds directly to the glass and the other component is polyethylene having an average molecular weight within the range of approximately 1,000 to 2,000 such that the γ-aminopropyltriethoxysilane/polyethylene layer is about 0.05–0.25 μm thick when dry. According to Example 1 of the patent, the intermediate coating is air dried then baked ten minutes at 150° C., and according to Example 2, air dried then baked 30 minutes at 150° C. Thereafter, the second coating of the copolymer of an alpha-olefin and an alpha, beta-unsaturated carboxylic acid is applied. It will be shown, hereinafter, that a baking temperature of 150° C. and a baking time of 10 minutes does not lead to the coating layer employed in the present invention in order to obtain the desired properties. Furthermore, the intermediate layer of this patent is not intended to be an external layer. Still further, Applicants may use other silanes than the specific γ-aminopropyltrimethoxysilane set forth in the patent.

Thus, as compared to Applicants invention, there is no intention in U.S. Pat. No. 4,130,677 for the intermediate layer to provide Applicants' properties, and in actuality, the method used to obtain the intermediate layer will not provide the desired properties of Applicants' invention. Furthermore, there is no label which is directly attached to the intermediate layer, and the intermediate layer will not be subjected to forces of abrasion in either the dry or wet state since it does not constitute an external layer.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The glass to be treated by the present invention is generally any glass, especially glass than can be used for containers, particularly lime (lime-soda) glass, or borosilicate glass. For more detail, attention is invited to the text Glass Engineering Handbook, 3rd edition, 1984, McLellan and Shand editors, McGraw-Hill, New York, especially chapters 1, 11 and 13.

The labels are paper, for example, and the glue or the like for adhering the label to the coating is generally a conventional water-soluble type known in the art.

In the nonlimiting examples which illustrate the invention the glass articles (bottles) are placed in a rotary device rotating at a speed of 75 to 130 rev/min and the deposition is done by spraying.

The treated bottles are next tested to determine their abrasion resistance, and adhesiveness to a label, and appearance. The tests are as follows:

1. Abrasion resistance

The test consists in placing two bottles which have undergone the same treatment, in a horizontal position, one on the other, their generatrix forming an angle of 30° and in pressing them one against the other while making them slide one over the other. When the pressure is increased, the abrasion is produced at the moment when the force applied must be increased to make the bottles continue to slide one over the other. The force of application is limited to 450 N because a higher force would result in the breakage of one or both bottles. In the wet test, the bottles are sprayed with a fine mist of water just prior to the test.

The acceptable value of the resistance to abrasion depends on the requirements made necessary by the use of the glass articles. Abrasion values of 200 N when dry and of 100 N in the wet state may be considered to be minimum values. It is generally considered that a good abrasion is obtained with values greater than 300 N when dry and greater than 200 N in the wet state.

By way of information, with untreated bottles, an abrasion appears starting at approximately 20 N.

2. Adhesiveness of a label (Labelability)

A paper label is applied with the aid of a conventional adhesive such as a casein-based aqueous adhesive. It is left to dry for 3 to 4 hours at ambient temperature or alternatively 20 minutes at 60° C.

To determine the adhesiveness of the label, an attempt is made to tear the latter away by pulling a portion of the label upwardly, 90°, in relation to the surface. Whereas this test is different from the crosscut method indicated in ASTMD 3359-58 described in U.S. Pat. No. 4,548,842, the results are substantially the same if not identical. The extent of surface of the label remaining on the glass is thus inspected and graded accordingly:

100% of the label: excellent adhesiveness
80% of the label: acceptable adhesiveness
<80% of the label: adhesiveness not acceptable 3. Appearance of the layer The layer must be homogeneous, transparent and invisible.

The inspection is visual:
Layer not visible, good appearance, no haze=value 0
Layer, as a whole, not visible with,
however, very small visible points of about 0.5 mm² and less than 5 points per cm²,
slight haze but acceptable appearance=value 1
Visible layer, more than 5 points per cm², haze, appearance not acceptable=value 2
Cloudy appearance, not acceptable=value 3

In the following examples there are employed:

| | | |
|---|---|---|
| as silane, | 3-aminopropyltrimethoxysilane: | APTMO |
| | 3-aminopropyltriethoxysilane: | APTEO |
| | [3-(2-aminoethyl)aminopropyl]trimethoxysilane: | DAMO |
| or | N-methyl-3-aminopropyltrimethoxysilane: | MAPTMO | as polyolefin, oxidized or partially oxidized polyethylene is employed:

the product Glasskote® SC100 from the company Elf Lubricants North America, which is in the form of aqueous emulsion with a solids content of 25% the product OG®25 from the company Trüb Emulsion, which is in the form of an aqueous emulsion with a solids content of 25%;

the product AC®629 from the company Allied Signal, which is in the form of an aqueous emulsion with a solids content of 25%.

EXAMPLES

EXAMPLE 1 a) Preparation of the aqueous composition 0.60 g of an aqueous polyethylene emulsion SC100 and 20 g of water were introduced into a 250-ml bottle provided with a bar magnet.

After having stirred for 1 minute 0.5 g of APTEO are added. Stirring is applied for 1 minute, then the composition is made up to 100 g with water and stirred again for 1 minute.

The composition thus prepared, containing 0.15% of polyethylene and 0.5% of silane (APTEO), is ready for use.

b) Deposition process

The glass bottles to be treated are heated in an oven at 140° C.–150° C. for one hour. The hot bottles are secured onto a rotary device.

While the rotary device is being rotated at a rate of 120 rev/min, the composition is sprayed, for 5 seconds, with the aid of a pneumatic Spraying device (2 bar pressure).

The bottles are left to cool to ambient temperature. The dry quantities of products are the following: silane: $8.2 \times 10^{-3}$ mg/cm², polymer: $2.5 \times 10^{-3}$ mg/cm².

A label is bonded on with the aid of an aqueous adhesive of the casein type; the bottles are then subjected to the abovementioned tests. The results are shown in Table 1.

EXAMPLE 2

The procedure is as in Example 1; the components (silane and polymer), their percentages and the test results are shown in Table 1. The dry quantities of products are the following: silane: $8.2 \times 10^{-3}$ mg/cm2, polymer: $8.2 \times 10^{-3}$ mg/cm².

EXAMPLE 3

The procedure is as in Example 1, but an aqueous emulsion is employed, with a solids content of 25% of partially oxidized polyethylene (OG®5 from the company Trub Emulsion). The dry quantities of products are the following: silane: $8.2 \times 10^{-3}$ mg/cm², polymer: $4.1 \times 10^{-3}$ mg/cm².

The results are given in Table 1.

EXAMPLE 4

The procedure is as in Example 1, but N-methyl-3-aminopropyltrimethoxysilane (MAPTMO) is employed as monoaminosilane. The components (silane and polymer), their percentage and the test results are shown in Table 1. The dry quantities of products are the following: silane: $8.2 \times 10^{-3}$ mg/cm², polymer: $4.1 \times 10^{-3}$ mg/cm².

EXAMPLES 5 TO 8

The procedure is as in Example 1. The components (silane and polymer), their percentage and the test results are shown in Table 1. The dry quantities of products are the following:

| | Silane | Polymer |
|---|---|---|
| Ex. 5 | $4.1 \times 10^{-3}$ mg/cm² | $2.1 \times 10^{-3}$ mg/cm² |
| Ex. 6 | $4.9 \times 10^{-3}$ mg/cm² | $2.5 \times 10^{-3}$ mg/cm² |
| Ex. 7 | $4.1 \times 10^{-3}$ mg/cm² | $4.1 \times 10^{-3}$ mg/cm² |
| Ex. 8 | $2.5 \times 10^{-3}$ mg/cm² | $4.1 \times 10^{-3}$ mg/cm² |

EXAMPLE 9 (COMPARATIVE)

The tests shown above are carried out on glass bottles carrying no deposit.

The results are given in Table 1.

EXAMPLE 10 (COMPARATIVE)

The procedure is as in Example 1 but [3-(2-aminoethyl) aminopropyl]-trimethoxysilane (DMAO) is employed as silane. The dry quantities of products are the following: silane: $8.2 \times 10^{-3}$ mg/cm² polymer: $2.5 \times 10^{-3}$ mg/cm².

The results are given in Table 1.

EXAMPLE 11 (COMPARATIVE)

As in Example 1, a coating is formed on glass bottles starting with an aqueous composition containing 0.5% of DAMO as silane and 1% of product AC®629 (partially oxidized polyethylene). The dry quantities of products are the following: silane: $8.2 \times 10^{-3}$ mg/cm², polymer: $1.6 \times 10^{-2}$ mg/cm².

As can be noted from the results given in Table 1, the coatings obtained from a composition containing an ethylene diaminopropyltrimethoxysilane (DAMO) have an insufficient resistance to abrasion in the wet state and the appearance of the coating is unacceptable.

TABLE 1

One-stage process

| EX. | SILANE | POLY-MER | ABRASION RESISTANCE dry | wet | APPEARANCE | ADHESIVENESS OF A LABEL |
|---|---|---|---|---|---|---|
| 1 | APTEO 0.5% | SC100 0.15% | 350 | 250 | 1 | 100% |
| 2 | APTMO 0.5% | SC100 0.5% | 300 | 250 | 1 | 100% |
| 3 | APTEO 0.5% | OG25 0.25% | 400 | 400 | 0 | 100% |
| 4 | MAPTMO 0.5% | OG25 0.25% | 400 | 350 | 1 | 100% |
| 5 | APTEO 0.25% | OG25 0.125% | 400 | 300 | 0 | 100% |
| 6 | APTEO 0.3% | OG25 0.15% | 400 | 350 | 0 | 100% |
| 7 | APTEO 0.25% | OG25 0.25% | 400 | 350 | 1 | 100% |
| 8 | APTEO 0.15% | OG25 0.25% | 400 | 350 | 1 | 100% |
| 9 comparative | | | 20 | 20 | 0 | 100% |
| 10 comparative | DAMO 0.5% | SC100 0.15% | 300 | 100 | 2 | 100% |
| 11 comparative | DAMO 0.5% | AC629 1% | 400 | 100 | 3 | 100% |

EXAMPLE 12

The procedure uses the same conditions as Example 1, but the glass bottles are heated in an oven at 80–90° C. The components (silane and polymer), their percentage and the test results are shown in Table 2. The dry quantities of products are the following: silane: $8.2 \times 10^{-3}$ mg/cm$^2$, polymer: $3.1 \times 10^{-3}$ mg/cm$^2$.

EXAMPLE 13

The procedure is as in Example 1, but the glass bottles are heated in an oven to 120–130° C. The components (silane and polymer), their percentage and the test results are shown in Table 2. The dry quantities of products are the following: silane: $8.2 \times 10^{-3}$ mg/cm$^2$, polymer: $3.1 \times 10^{-3}$ mg/cm$^2$.

EXAMPLE 14

In this example the aqueous composition of silane and polymer is deposited on glass bottles at ambient temperature:

a) preparation of the aqueous composition

The procedure is as shown in Example 1, the components and the percentages given in Table 2 being employed.

b) the deposition process

The bottles, which are at ambient temperature, are secured to a rotary device. While the device is rotated at a speed of 120 rev/min, the composition is sprayed for 5 seconds with the aid of a pneumatic spraying device (2 bar pressure).

The temperature of the surface of the bottles is then brought from ambient temperature to 80° C. within 10 seconds with the aid of an infrared oven with a power output of 18 kW.

Without any further heating, the bottles are allowed to cool to ambient temperature. The dry quantities of products are the following: silane: $8.2 \times 10^{-3}$ mg/cm$^2$, polymer: $4.1 \times 10^{-3}$ mg/cm$^2$. A label is bonded with the aid of an aqueous adhesive of the casein type, and the bottles are then subjected to the tests mentioned above. The results are shown in Table 2.

TABLE 2

Single-stage process

| EX. | SILANE | POLY-MER | ABRASION RESISTANCE dry | wet | APPEARANCE | ADHESIVE NESS OF A LABEL |
|---|---|---|---|---|---|---|
| 12 | APTEO 0.5% | OG25 0.19% | 400 | 400 | 1 | 100% |
| 13 | APTEO 0.5% | OG25 0.19% | 400 | 400 | 1 | 100% |
| 14 | APTEO 0.5% | OG25 0.25% | 400 | 400 | 0 | 100% |

EXAMPLE 15 (TWO STAGES)

The two components (silane and polyethylene) are deposited in two stages.

The silane employed is APTEO in aqueous solution at a concentration of 0.5%.

An aqueous emulsion containing 0.15% of Glasskote®SC100 is employed to form the polyethylene deposit.

The glass bottles, heated in an oven to 140° C.–150° C. for one hour are secured to a rotary device. While the rotary device is rotated at a speed of 120 rev/min, the aqueous solution of silane is sprayed for 5 seconds with the aid of a pneumatic spraying device (2 bar pressure) and the polyethylene composition is then sprayed for 5 seconds. The bottles are allowed to cool and subjected to the tests mentioned above. The dry quantities of products are the following: silane: $8.2 \times 10^{-3}$ mg/cm$^2$, polymer: $2.5 \times 10^{-3}$ mg/cm$^2$.

The results are given in Table 3.

EXAMPLE 16 (TWO STAGES)

The procedure is as in Example 15. The components (silane and polymer), their percentage and the results of the tests are shown in Table 3. The dry quantities of products are the following: silane: $1.6 \times 10^{-3}$ mg/cm$^2$, polymer: $4.1 \times 10^{-3}$ mg/cm$^2$.

EXAMPLE 17 (TWO STAGES)

In this example the aqueous silane composition is deposited on the glass surface at low temperature (1° C.).

The procedure is as in Example 15 with components (silane and polymer) and percentages shown in Table 3.

The bottles, which are at 1° C., are secured to a rotary device.

While the device is rotated at a speed of 120 rev/min the composition containing the silane is sprayed for 5 seconds with the aid of a pneumatic spraying device (2 bar pressure).

The temperature of the surface of the bottles is then brought to 80° C. within 10 seconds with the aid of an infrared oven with a power output of 18 kW.

The bottles are allowed to cool to a temperature lower than 50° C. and the aqueous composition containing the polymer is then applied by the same method. The temperature of the surface of the bottles is next brought to 80° C. with the aid of an infrared oven of a power output of 18 kW.

The bottles are allowed to cool to the ambient temperature. The dry quantities of products are the following: silane: $1.6 \times 10^{-3}$ mg/cm$^2$, polymer: $2.1 \times 10^{-3}$ mg/cm$^2$.

A label is bonded with the aid of an aqueous adhesive of the casein type; the bottles are then subjected to the tests mentioned above.

The results are shown in Table 3.

EXAMPLE 18 COMPARATIVE (TWO STAGES)

In this example [3-(2-aminoethyl)aminopropyl] trimethoxysilane (DAMO) in the form of aqueous solution at a concentration of 0.5% is employed as silane and the product AC629, in the form of aqueous solution at a concentration of 0.15% as polyethylene, in accordance with the teaching of U.S. Pat. No. 3,438,801. The deposition conditions are those of Example 15. The dry quantities of products are the following: silane: $8.2 \times 10^{-3}$ mg/cm$^2$, polymer: $2.5 \times 10^{-3}$ mg/cm$^2$.

The results are given in Table 3.

TABLE 3

Two-stage process

| EX. | STAGE 1 SILANE | STAGE 2 POLYMER | ABRASION RESISTANCE dry | wet | APPEARANCE | ADHESIVENESS OF A LABEL |
|---|---|---|---|---|---|---|
| 15 | APTEO 0.5% | SC100 0.15% | 400 | 400 | 1 | 100% |
| 16 | APTEO 0.1% | OG25 0.25% | 400 | 400 | 1 | 100% |
| 17 | APTEO 0.1% | OG25 0.125% | 400 | 350 | 0 | 100% |
| 18 comparative | DAMO 0.5% | AC629 0.15% | 250 | 250 | 2 | no <80% |

EXAMPLE 19 (COMPARATIVE)

The following Examples 19(a) and 19(b) in Table 4, are carried out in one step or two steps respectively.

TABLE 4

| Ex. | Silane | PE | Abrasion Resistance Dry | Wet | Labelability | Appearance Aspect |
|---|---|---|---|---|---|---|
| 19a | One step process as in Example 13 APTEO 4% → $6.6 \times 10^{-2}$ mg/cm$^2$ | OG 25 2% → $3.3 \times 10^2$ mg/cm$^2$ | 400 | 400 | 100% | 2 |
| 19b | Two step process as in Example 15 APTEO 4% → $6.6 \times 10^{-2}$ mg/cm$^2$ | SC100 2% → $3.3 \times 10^2$ mg/cm$^2$ | 400 | 400 | 0% | 3 |

As can be noted from the values in the above table, for quantities of dry silane higher than the maximum indicated value ($6.6 \times 10^{-2}$ compared to $5 \times 10^{-2}$), the final coatings are not acceptable either because of their poor appearance as in Example 1 9A or because of both their poor appearance and poor labelability according to Example 19B. This is true even though the amount of dried polymer is within the recommended range of the present invention ($3.3 \times 10^{-2}$ within the range $5 \times 10^{-4}$ to $5 \times 10^{-2}$).

EXAMPLE 20

The purpose of this example is to provide an understanding of the correlation of the desired properties of the invention with the more narrowly defined ranges of the silane and polyethylene components in the coating of the present invention, as seen from Table 5.

TABLE 5

| Ex. | Silane APTEO | PE OG 25 | Abrasion Resistance Dry | Wet | Labelability | Appearance Aspect |
|---|---|---|---|---|---|---|
| 20a | 0.05% → $0.82 \times 10^{-3}$ mg/cm$^2$ | 0.125% → $2.1 \times 10^{-3}$ mg/cm$^2$ | 350 | 250 | 100% | 1 |
| To compare with Example 17: | | | | | | |
| 17 | 0.1% → $1.6 \times 10^{-3}$ mg/cm$^2$ | 0.125% → $4.1 \times 10^{-3}$ mg/cm$^2$ | 400 | 350 | 100% | 0 |
| 20b | 0.01% → $0.16 \times 10^{-3}$ mg/cm$^2$ | 0.25% → $4.1 \times 10^{-3}$ mg/cm$^2$ | 300 | 200 | 100% | 1 |
| To compare with Example 16 | | | | | | |
| 16 | 0.1% → $1.6 \times 10^{-3}$ mg/cm$^2$ | 0.25% → $4.1 \times 10^{-3}$ mg/cm$^2$ | 400 | 40 | 100% | 1 |

It is to be noted that in Examples 20a and 20b, the desired properties of labelability and adherence are satisfactory, but the values of abrasion resistance in the dry state as well as in the wet state are not as high as those obtained in Examples 16 and 17, the latter Examples corresponding to the dry quantities of silane and polymer in Applicants' preferred range of $1.4 \times 10^{-3}$ to $5.6 \times 10^{-3}$ mg/cm$^2$ for the silane and $2 \times 10^{-3}$ to $4.5 \times 10^{-3}$ mg/cm$^2$ for the polyethylene. Nevertheless, these values for dry and wet abrasion resistance obtained in Examples 20a and 20b are acceptable according to the desired properties of the present invention.

EXAMPLE 21

The following Example also relates to results obtainable with respect to the amounts of silane and polymer in Applicants' advantageous and preferred ranges ($a_2$ and $a_3$).

A composition containing 0.25% APTEO as the silane and 0.37% OG25 as the polymer were used in accordance with the one step process as in Example 5. The final layer contained the following concentrations of silane and polymer: $4.1 \times 10^{-3}$ mg/cm$^2$ and the polymer $6 \times 10^{-3}$ mg/cm$^2$, yielding the following results.

| Dry resistance to abrasion | Wet resistance to abrasion |
|---|---|
| 400 N | 250 N |
| Labelabity | Appearance |
| 100% | 1 |

The dry quantities of silane and polymer in the above Example are within the broadest range ($a_1$) of the invention. The results are outside of the advantageous range ($a_2$) by the quantity of the silane and outside of the preferred range ($a_3$) by the quantity of the polymer. If one compares these results with those obtained by Example 5 (inside the range $a_3$) which relate to the most preferred range and those of Example 3 (inside the range $a_2$), the preferred range, they are not as good.

EXAMPLE 22

In the following test, the examples of the DuPont U.S. Pat. No. 4,130,677 are both reproduced and extended by lowering the heating time to 4 minutes. The results are shown in the following Table 6, wherein Example 1 and Example 2 are taken from the duPont patent.

TABLE 6

| | Baking step | Dry scratch | Wet scratch | Label-ability | Appearance |
|---|---|---|---|---|---|
| Example 1: | 150° C./10 min | 400 N | 400 N | no | 3 |
| One Step | 150° C./4 min | 400 N | 350 N | no | 3 |
| Example 2: | Silane: 150° C./10 min PE: 150° C./10 min | 400 N | 350 N | no | 3 |
| Two steps | Silane: 150° C./4 min PE: 150° C./4 min | 400 N | 350 N | no | 3 |

Under the conditions of Examples 1 and 2 of the DuPont patent, even lowering the heating time to 4 minutes, the resultant properties of labelability and appearance are woefully inadequate. Furthermore, it is to be noted that in Example 2 of the patent, the silane layer is subjected to a heating time of substantially greater than 10 minutes, equaling 30 minutes at 150° C. These Examples demonstrate the criticality of the temperature/heating time for the treatment of the silane, comparing Applicants' Examples 14 and 17, for example, wherein a heating time of only 10 seconds is employed, and which leads to the highly desirable properties of the present invention.

The preceding examples can be repeated with similar success by substituting the generically or specifically described reactants and/or operating conditions of this invention for those used in the preceding examples.

The entire disclosure of all applications, patents and publications, cited above and below, and of corresponding French applications 96.07234 and 97.02728, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A glass article carrying a coating which is practically transparent, capable of being labeled and resistant to abrasion, said coating resulting from the application, onto the glass surface, of at least one monoaminosilane and of at least one lubricating substance, the monoaminosilane(s) corresponding to the general formula:

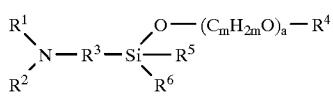

or in its quaternized form:

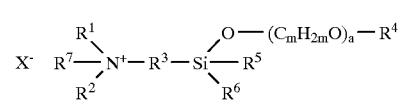

in which:
each of $R^1$ and $R^2$, which are identical or different, denotes a hydrogen atom or an allyl group containing from 1 to 4 carbon atoms, $R^3$ is a linear or branched alkylene group containing 2 to 11 carbon atoms, an oxyalkylene or polyoxyalkylene group containing from 2 to 4 carbon atoms in the alkylene chain, said oxyalkylene or polyoxyalkylene group being bonded to the silicon via a carbon atom, $R^4$ denotes an alkyl group containing 1 to 4 carbon atoms, each of $R^5$ and $R^6$, which are identical or different, denotes an alkyl group containing 1 to 4 carbon atoms or a group $-O-(C_nH_{2n}O)_b-R^4$ in which $R^4$ has the above meaning, each of m and n, which are identical or different, denotes the integer 2, 3 or 4, each of a and b, which are identical or different, denotes the integer 0, 1 or 2, $R^7$ denotes a hydrogen atom or an alkyl group containing from 1 to 4 carbon atoms, and $X^-$ is an anion, said coating having been heat treated at a sufficient temperature and for a sufficient time to provide an abrasion resistance of at least 200N in the dry and at least 100N in the wet state, a labelability of at least 80%, and an appearance having a value of 0 or 1, the dry quantity of the at least one monoaminosilane being between $10^{-4}$ mg/cm$^2$ to $5\times10^{-2}$ mg/cm$^2$, and the dry quantity of the lubricating substance being between $5\times10^{-2}$ mg/cm$^2$ and $5\times10^{-2}$ mg/cm$^2$.

2. An article according to claim 1, wherein the coating contains a dry quantity of the monoaminosilane of $6\times10^{-3}$ to $5\times10^{-2}$ mg/cm$^2$ and a dry quantity of the lubricating substance of between $2\times10^{-3}$ mg/cm$^2$ to $1\times10^{-2}$ mg/cm$^2$.

3. An article according to claim 1, wherein the coating is obtained by subjecting the deposited coating to a thermal treatment such that at least the surface of the glass article reaches a temperature between 60 and 160° C.

4. An article according to claim 1, wherein the coating is obtained by subjecting the deposited coating to a thermal treatment such that at least the surface of the glass article reaches a temperature between 80 and 150° C.

5. An article in accordance with claim 1, in which the monoaminosilane(s) correspond to the formulae I or II in which $R^1$ and $R^2$, which are identical or different, denote a hydrogen atom or a methyl group, $R^3$ is a propylene, butylene or isopropylene group, $R^4$ denotes a methyl or ethyl group, each of $R^5$ and $R^6$, which are identical or different, denotes methyl, ethyl or $-O-(C_nH_{2n}O)_b-R^4$, m and n denote the integer 2 or 3, a and b denote the number 0, 1 or 2, $R^7$ is a hydrogen atom or methyl and $X^-$ is 1 chloride, bromide, sulphate or methylsulphate anion.

6. An article according to claim 5, in which the monoaminosilane(s) are chosen from the group consisting of 3-aminopropyltrimethoxysilane, 3-aminopropyltriethoxysilane, 4-aminobutyltrimethoxysilane, N-methyl-3-aminopropyltrimethoxysilane and 3-aminopropyltris(2-methoxyethoxyethoxy)silane.

7. An article according to claim 6, in which the lubricating substance is chosen from the group consisting of oleic acid, sodium stearate, ammonium stearate, $C_8$ or higher alkylamine acetate, polyethylene glycol, a polyolefin, and mixtures thereof.

8. An article according to claim 6, in which the lubricating substance is an optionally oxidized or partially oxidized polyolefin.

9. An article in accordance with claim 8, in which the oxidized or partially oxidized polyolefin is oxidized or partially oxidized polyethylene.

10. An article in accordance with claim 9, in which the polyethylene has a weight-average molecular mass of between 1000 and 15,000.

11. An article in accordance with claim 1, wherein the glass article is a bottle.

12. An article according to claim 1, wherein the glass article is a recycled bottle.

13. A glass article according to claim 1 having a label affixed to the coating.

14. A glass article according to claim 11 having a label affixed to the coating.

15. A glass article according to claim 1, wherein the dry abrasion resistance is higher than 300 N, the wet abrasion resistance is higher than 200 N, the labelability is 100%, and the appearance has a value of 0 or 1.

16. A glass article according to claim 11, wherein the dry abrasion resistance is higher than 300 N, the wet abrasion resistance is higher than 200 N, the labelability is 100%, and the appearance has a value of 0 or 1.

17. A glass article according to claim 14, wherein the dry abrasion resistance is higher than 300 N, the wet abrasion resistance is higher than 200 N, the labelability is 100%, and the appearance has a value of 0 or 1.

18. A process for the manufacture of an article in accordance with claim 1, comprising depositing at least one monoaminosilane and at least one lubricating substance, the monoaminosilane(s) corresponding to the general formula:

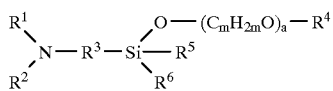
    I or in its quaternized form:

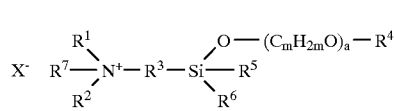
    II in which:
each of $R^1$ and $R^2$, which are identical or different, denotes a hydrogen atom or an alkyl group containing from 1 to 4 carbon atoms, $R^3$ is a linear or branched alkylene group containing 2 to 11 carbon atoms, or else an oxyalkylene or polyoxyalkylene group containing from 2 to 4 carbon atoms in the alkylene chain, said oxyalkylene or polyoxyalkylene group being bonded to the silicon via a carbon atom, $R^4$ denotes an alkyl group containing 1 to 4 carbon atoms, each of $R^5$ and $R^6$, which are identical or different, denotes an alkyl group containing 1 to 4 carbon atoms or else a group $—O—(C_nH_{2n}O)_b—R^4$ in which $R^4$ has the above meaning, each of m and n, which are identical or different, denotes the integer 2, 3 or 4, each of a and b, which are identical or different, denotes the integer 0, 1 or 2, $R^7$ denotes a hydrogen atom or an alkyl group containing from 1 to 4 carbon atoms, and $X^-$ is an anion, in order to provide a coating in which the dry quantity of the monoaminesilane is between $10^{-4}$ mg/cm$^2$ and $5\times10^{-4}$ mg/cm$^2$ and the dry quantity of the lubricating substance is between $5\times10^{-4}$ mg/cm$^2$ and $5\times10^{-4}$ mg/cm$^2$, and subjecting the resultant article to thermal heating, so that at least the surface of the glass has a temperature between 60° and 160° C., said thermal heating being conducted for a sufficient time to provide the resultant glass with a wet abrasion resistance of at least 100 N and a dry abrasion resistance of at least 200 N, a labelability of at least 80%, and an appearance having a value of 0 or 1.

19. A process according to claim 18 in which the thermal treating is conducted at a temperature of 80–150° C.

20. A process according to claim 18, wherein the quantity of dry aminosilane is between $6\times10^{-3}$ and $5\times10^{-2}$ mg/cm$^2$ and the quantity of dry lubricating substance is between $2\times10^{-3}$ and $1\times10^{-2}$ mg/cm$^2$.

21. A process according to claim 18, wherein the coating is deposited in one step by applying an aqueous solution of the monoaminosilane and the lubricating substance.

22. A process in accordance with claim 21, according to which the thermal treatment is carried out at a temperature between 80° C. and 150° C.

23. A process in accordance with claim 22, according to which the heat treatment is carried out by heating at least the surface of the glass article to a temperature between 80° C. and 150° C.

24. A process in accordance with claim 18, according to which an aqueous solution of monoaminosilane(s) is deposited in a first stage and an aqueous composition of lubricating substance(s) in a second stage.

25. A process in accordance with claim 18, according to which at least one monoaminosilane is employed corresponding to the formulae I or II, in which $R^1$ and $R^2$, which are identical or different, denote a hydrogen atom or a methyl group, $R^3$ is a propylene, butylene or isopropylene group, $R^4$ denotes a methyl or ethyl group, each of $R^5$ and $R^6$, which are identical or different, denotes a methyl or ethyl group or else the group $—O—(C_nH_{2n}O)_b—R^4$, m and n denote the integer 2 or 3, a and denote the number 0, 1 or 2, $R^7$ is a hydrogen atom or a methyl group and $X^e$ is the chloride, bromide, sulphate or methylsulphate anion.

26. A process in accordance with claim 18, according to which the monoaminosilane is chosen from the group consisting of 3-aminopropyltrimethoxysilane, 3-aminopropyltriethoxysilane, 4-aminobutyltrimethoxysilane, N-methyl-3-aminopropyltrimethoxysilane and 3-aminopropyltris(2-methoxyethoxyethoxy)silane.

27. A process in accordance with claim 18, according to which the lubricating substance is chosen from the group consisting of oleic acid, sodium stearate, ammonium stearate, $C_8$ or higher alkylamine acetate, polyethylene glycol, a polyolefin and a mixture thereof.

28. A process in accordance with claim 18, according to which the lubricating substance is an optionally oxidized or partially oxidized polyolefin.

29. A process in accordance with claim 28, according to which oxidized or partially oxidized polyethylene is employed as polyolefin.

30. A process in accordance with claim 29, in which the polyethylene has a weight-average molecular mass of between 1000 and 15,000.

31. A process in accordance with claim 28, according to which the polyolefin is in the form of an ionic or a nonionic aqueous emulsion.

32. A process according to claim 18 further comprising adhering a label onto the outer layer of said coating.

33. In a process of washing a bottle, the improvement wherein the bottle is a bottle in accordance with claim 15.

34. A process according to claim 18, wherein the resultant article is not coated with a copolymer of an alpha-olefin and an alpha,betacarboxylic acid.

35. A labeled glass article carrying a coating which is practically transparent, capable of being labeled and resistant to abrasion, said coating resulting from the application, onto the glass surface, of at least one monoaminosilane and of at least one lubricating substance, the monoaminosilane (s) corresponding to the general formula:

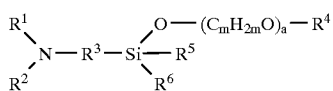
I or in its quaternized form:

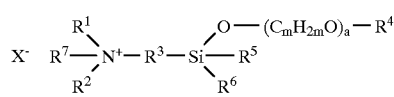
II in which:

each of $R^1$ and $R^2$, which are identical or different, denotes a hydrogen atom or an alkyl group containing from 1 to 4 carbon atoms, $R^3$ is a linear or branched alkylene group containing 2 to 11 carbon atoms, an oxyalkylene or polyoxyalkylene group containing from 2 to 4 carbon atoms in the alkylene chain, said oxyalkylene or polyoxyalkylene group being bonded to the silicon via a carbon atom, $R^4$ denotes an alkyl group containing 1 to 4 carbon atoms, each of $R^5$ and $R^6$, which are identical or different, denotes an alkyl group containing 1 to 4 carbon atoms or a group $—O—(C_nH_{2n}O)_b—R^4$ in which $R^4$ has the above meaning, each of m and n, which are identical or different, denotes the integer 2, 3 or 4, each of a and b, which are identical or different, denotes the integer 0, 1 or 2, $R^7$ denotes a hydrogen atom or an alkyl group containing from 1 to 4 carbon atoms, $X^-$ is an anion, and a label directly adhering to said coating.

36. A glass article according to claim 1, wherein the coating contains a dry quantity of the monoaminosilane of $1.4 \times 10^{-3}$ to $5.6 \times 10^{-3}$ mg/cm$^2$ and a dry quantity of lubricating agent of $2 \times 10^{-3}$ mg/cm$^2$ to $4.5 \times 10^{-3}$ mg/cm$^2$.

37. A process according to claim 18, wherein the coating contains a dry quantity of the monoaminosilane of $1.4 \times 10^{-3}$ to $5.6 \times 10^{-3}$ mg/cm$^2$ and a dry quantity of lubricating agent of $2 \times 10^{-3}$ mg/cm$^2$ to $4.5 \times 10^{-3}$ mg/cm$^2$.

* * * * *